United States Patent

Hantmann

[11] Patent Number: 5,873,946
[45] Date of Patent: Feb. 23, 1999

[54] INSTALLATION AND A PROCESS FOR LUBRICATING, CLEANING AND/OR DISINFECTING CONVEYOR BELTS

[75] Inventor: Bernhard Hantmann, Grabenstaett, Germany

[73] Assignee: Henkel-Ecolab GmbH & Co. Ohg, Duesseldorf, Germany

[21] Appl. No.: 619,490

[22] PCT Filed: Sep. 14, 1994

[86] PCT No.: PCT/EP94/03078

§ 371 Date: Mar. 25, 1996

§ 102(e) Date: Mar. 25, 1996

[87] PCT Pub. No.: WO95/08498

PCT Pub. Date: Mar. 30, 1995

[30] Foreign Application Priority Data

Sep. 23, 1993 [DE] Germany .......................... 43 32 375.8
Oct. 29, 1993 [DE] Germany .......................... 43 37 034.9

[51] Int. Cl.[6] ..................................................... B08B 1/02
[52] U.S. Cl. ..................................... 134/15; 137/3; 137/7; 137/84; 137/82; 137/89; 137/114; 184/15.1; 422/28; 134/88; 134/89
[58] Field of Search ............................. 137/3, 7, 84, 82, 137/89, 114; 184/15.1; 422/28; 134/88, 15, 89

[56] References Cited

U.S. PATENT DOCUMENTS

| 4,196,748 | 4/1980 | Gillespie | 137/565 |
| 4,262,776 | 4/1981 | Wilson | 184/15 R |
| 4,738,541 | 4/1988 | Weber | 366/152 |
| 5,247,957 | 9/1993 | Weisse | 137/3 |

FOREIGN PATENT DOCUMENTS 0169723 1/1986 European Pat. Off. .

*Primary Examiner*—Margaret W. Glass
*Attorney, Agent, or Firm*—Wayne C. Jaeschke; Frank E. Robbins; Joseph J. Buczynski

[57] ABSTRACT

An installation for lubricating, cleaning and/or disinfecting conveyor belts for containers, more particularly for foods, such as bottles, glasses, cans, bags and the like, comprising a central metering station connectable to a water pipe used to dilute a concentrated lubricant, cleaner or disinfectant, and several distributing pipes connected to the metering station lead to the points of use. At each point of use there is a mixing valve (13–19) connectable to distribution line (52) and the water pipe (23) and individually adjustable for each point of use and a pressure reducer (50, 51) fitted upstream of each mixing valve. Varying concentration can be provided for each point of use (31–37) with little technical complexity. In another embodiment, the invention is the process carried out by the installation.

11 Claims, 2 Drawing Sheets

INSTALLATION AND A PROCESS FOR LUBRICATING, CLEANING AND/OR DISINFECTING CONVEYOR BELTS

BACKGROUND OF THE INVENTION

1. Field of the Invention

This invention relates to an installation for lubricating, cleaning and/or disinfecting conveyor belts for containers, more particularly for foods, such as bottles, glasses, cans, bags and the like. The installation comprises at least one central metering station—designed for connection to a water pipe—for diluting a concentrated lubricant, cleaner or disinfectant and several distributing pipes connected to the metering stations and leading to the points of use.

2. Description of the Related Art

In the food industry, the food containers, for example beverage bottles, are transported on conveyor belts, more particularly slat belts, hinged chains and the like. Thus, beverage bottles have to be transported from the unpacking station to the washing machine, to the filler, to the labeling machine and to the packing station. In the beverage industry, for example in breweries, the washing, filling and labeling of bottles is mainly carried out automatically. Accordingly, the high-speed conveyor belts, which are made of stainless steel or plastic, have to be lubricated with a chain lubricant which is also known as a "belt lubricant". In addition, the conveyor belts have to be cleaned and/or disinfected at more or less regular intervals. The necessary concentration of the chain lubricant depends on a number of parameters, including for example the belt speed, the surface quality and the loading of the belts. For this reason, different concentrations have to be used depending on where the lubricant is applied.

The present state of the art in belt lubrication is described in detail in an article in the journal "Brauwelt", Vol 131 (1991), No. 44, pages 2026–2032. Reference is made to that article to complete the disclosure of the present invention.

The cleaners, disinfectants and belt lubricants are supplied as concentrates by the manufacturers and, in the food-processing plant, are applied to the conveyor belt, for example by spraying, after dilution with water to the particular in-use concentration required. The solution then runs off the belt into a wastewater channel via a collector.

The solution to be used with the particular concentration required may be prepared from the concentrate as supplied by the manufacturer in various ways. Thus, the concentrates may be taken to the points of use, diluted with water to the particular in-use concentration and directly used. Various metering systems, for example injectors, metering pumps or other volume- or time-controlled and quality-controlled systems, may be used for dilution. However, the concentrates have to be transported to the particular points of use within the plant and separate metering systems have to be provided for each point of use.

Although the concentrate could in principle be transported from the chemicals storeroom to the points of use through a pipe, this would not be appropriate because the corresponding concentrate—as a water-endangering and caustic liquid—should not be transported through production rooms and work rooms. In addition, the blending of two liquid streams in a ratio of 1:200 to 1:1000 through a blending valve is technically very complicated if it is to be carried out with the necessary accuracy.

In another variant, the concentrates are diluted to the required in-use concentration in a central metering station. The solution thus prepared is then transported to the points of use through distributing pipes. The present invention is concerned with the further development of such central conveyor belt lubrication systems. Various concentrations of the solutions intended for the individual points of use are possible, but do require several central metering stations which transport the solutions to the conveyor belts through separate distributing pipes. This requirement means additional expenditure on metering technology and pipes.

With a conventional metering system based on diaphragm metering, cleaning, disinfecting and belt lubricating solutions intended for direct throughputs of 5 $m^3$/hour or higher are extremely difficult to prepare with a uniform distribution of concentration for variable flow rates.

This is attributable above all to the limited metering frequency of the diaphragm metering pumps. When the maximum metering frequency is reached, a higher throughput of the in-use solution with the necessary concentration can only be achieved by increasing the amount added during each individual stroke of the diaphragm pump. As a result, the proportional amount added cannot be uniformly mixed in the pipe.

SUMMARY OF THE INVENTION

The problem addressed by the present invention was to provide an installation for the lubrication, cleaning and/or disinfection of conveyor belts which would enable the in-use solution to be adjusted to the different concentrations required for the different points of use at only minimal expense by comparison with the prior art.

In an installation of the type mentioned at the beginning, the solution to this problem as provided by the invention is characterized in that a mixing valve designed for connection to the distributing pipe and to the water pipe and for individual adjustment for each point of use and a pressure reducer preceding each mixing valve are provided at each point of use. A uniformly mixed stock solution and hence in-use solution is obtained even at high throughputs. This is because the stock solution is prepared with a relatively high concentration and at a relatively low throughput so that the metering pulse/interval in the pipe is considerably shortened, the miscibility of the concentrates in the pipe is improved and on-line metering is thus possible. There is no longer any need for cumbersome and high-cost tanks for preparing and mixing the solution or for expensive metering techniques.

The pressure reducer preceding the mixing valve in each stock solution and water supply pipe equalizes any pressure variations in the feed systems. The adjustable, defined pressure ratio between the components to be mixed provides for a constant mixture concentration after the mixing valve.

In addition, the use of stock solutions and the fact that they are mixed with water at the point of use considerably reduces the pipe lengths of the distributing pipe system in relation to the prior art with its central metering station because there is no longer any need for a separate metering station with a separate pipe to the point of use for each separately prepared, different in-use concentration. The minimal capital investment in relation to the prior art provides for the use of concentrations differing according to the points of use even in those cases where, hitherto, only one concentration was used on economic grounds.

The cost of the pipework for the mixing water system is minimal compared with the laying of several pipes for the in-use solution because the mixing water can be taken from existing rinsing water systems or from the fresh water supply. In addition, only one pipe system is required for mixing several concentrations.

Accordingly, the invention enables different concentrations of the cleaner, disinfectant and belt lubricant to be used. The in-use concentration can always be adjusted and varied in situ to fulfill requirements in regard to soiling, disinfection regulations and the specific belt lubrication requirements. Since the concentration of the in-use solution can be individually adjusted for each point of use, the concentrates can be economically used without over- or underdosage.

Depending on the length of the pipe for the in-use solution after the mixing valve, on its cross-section and on the flow rate of the in-use solution, it may be favorable for the mixing valve to be followed by a static mixer. The specific conditions prevailing at the point of use are also key factors in the choice of this additional static mixer. To establish the concentrations according to operating requirements, it is of advantage to provide a manually or automatically operable control element at the mixing valve to adjust the mixing ratio. In this way, the installation can be adapted to changing operating conditions.

The component streams are prevented from flowing back by the provision of non-return valves in the water connection and in the supply pipe for stock solution.

The invention also relates to a process for mixing, cleaning and/or disinfecting conveyor belts for containers, more particularly for foods, such as bottles, glasses, cans, bags and the like, in which a concentrated lubricant, cleaner or disinfectant is diluted with water in a central metering station and the resulting in-use solution is transported to various points of use where it is applied to the particular conveyor belt.

In this process, the solution to the problem stated above is characterized in that the concentrate is prediluted in a central metering station to form a stock solution which has at least the highest concentration required at the point of use and is only diluted with water at the point of use to the concentration required there in order to obtain the in-use solution.

The stock solution must have at least the highest concentrations required at the points of use. In a particularly favorable embodiment, however, the concentration of the stock solution is adjusted to between three and six times the concentration required at the points of use.

Depending on the design of the pipe systems and the flow rate of the in-use solution, it can be of advantage uniformly to mix the in-use solutions, for example in a static mixer, before they are applied to the conveyor belt at their point of use. In other cases, a uniform concentration is not necessary or may even be established without additional measures by virtue of the predetermined process conditions.

To prepare a solution of belt lubricant, a relatively small central metering station is installed in the chemicals storeroom and the stock solution is transported to the lubrication circuits of the conveyors. A mixing valve is associated with each lubrication circuit. Different in-use concentrations can thus be established to meet various lubrication requirements and thus to fulfill the various operating and hygiene standards which the conveyor zones are expected to meet.

The process according to the invention and the installation according to the invention may also be used for the centralized preparation of cleaning and disinfecting solutions and for their application in the food industry, for example for "hidden" foam cleaning tasks.

A constant cleaning and disinfecting solution is prepared as a stock solution in a central chemicals room, transported to the decentralized cleaning stations via a distributing pipe system and diluted with water to the necessary in-use concentration via the mixing valve. The concentration of the in-use solution may be individually adjusted for each particular field of application so that the various cleaning and disinfection requirements can be optimally satisfied.

BRIEF DESCRIPTION OF THE DRAWINGS

Examples of embodiment of the invention are described in detail in the following with reference to the accompanying drawings, wherein.

DESCRIPTION OF THE PREFERRED EMBODIMENT

Figure 1:
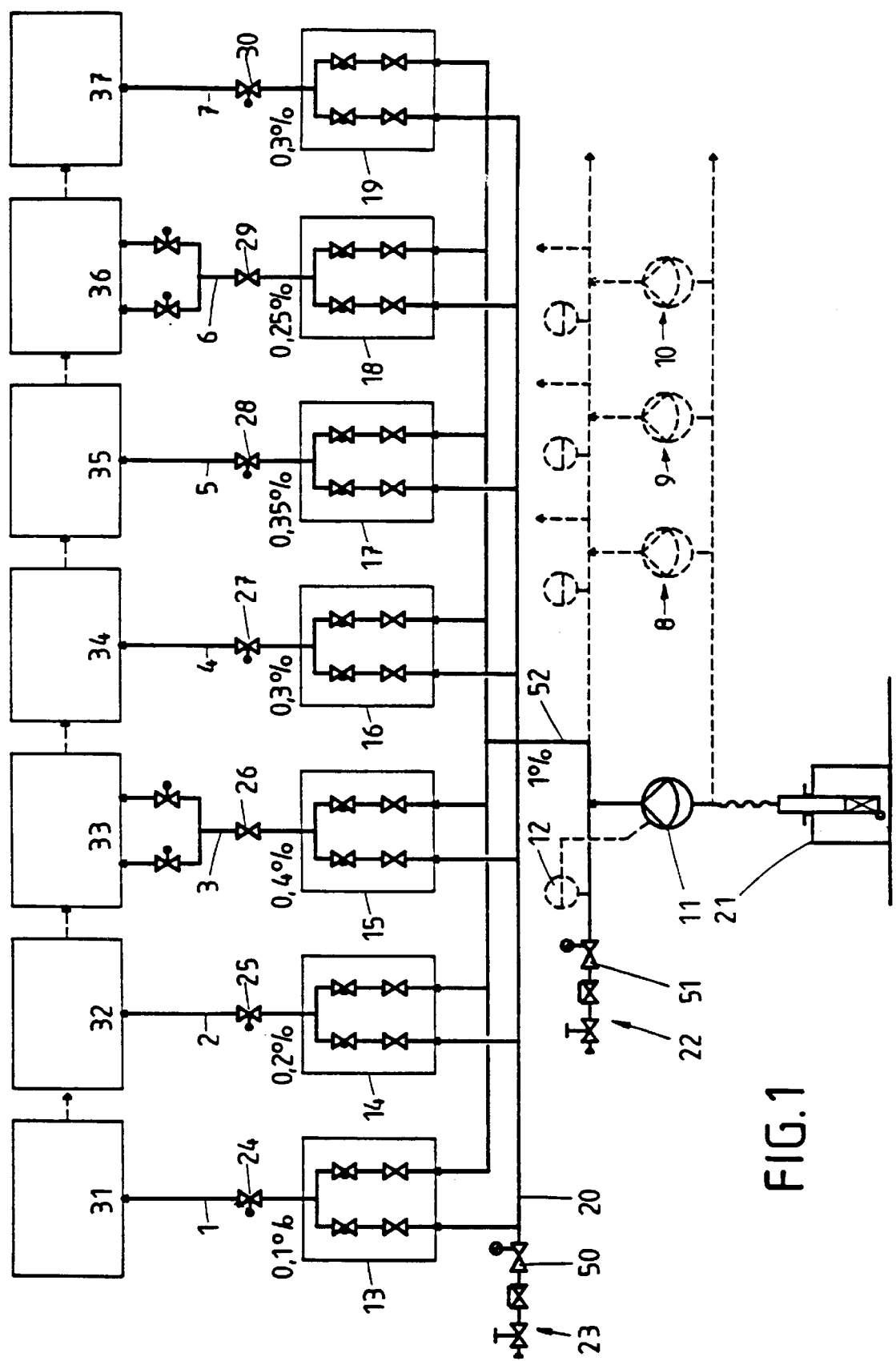
FIG. 1 is a process flow chart for a belt lubrication system.

The spray system for applying the belt lubricant in FIG. 1 is divided up into various lubrication circuits according to the various conveyor sections. Seven lubrication circuits are provided and are each supplied with belt lubricating solution through feed pipes 1 to 7. Hitherto, these various lubrication circuits were either supplied with solutions of only one concentration or a separate metering station 8 to 10 was required for each lubrication circuit, as shown in chain lines.

Since different in-use concentrations are being required to an increasing extent for the various lubrication circuits in practice, the invention affords the possibility of preparing these concentrations with less outlay on equipment than before as follows:

In a chemicals storeroom, a stock solution is prepared by proportional metering (pulse water meter 12 and metering pump 11) and is delivered to the various lubrication circuits through a distributing pipe system. The stock solution has a concentration, for example 1%, which corresponds to around 3 to 6 times the in-use concentration. Before the pipe divides at each lubrication circuit to form the spray system, a mixing valve 13 to 19 is installed in this new process and dilutes the stock solution prepared in the chemicals storeroom to the required concentration with fresh water from a second branch pipe system 20.

In addition, FIG. 1 shows the concentrate tank 21 in the chemicals storeroom, a first fresh water connection 22, a second fresh water connection 23, the magnetic valves 24 to 30 provided for each lubricating circuit, the spray systems 31 and 32 with concentrations of 0.1 and 0.2% for the box conveyor, the spray system 33 for the dirty bottles, the spray systems 34 and 35 for the empty bottles, the spray systems 36 and 37 for the full bottles and the distributing pipe 52 for the stock solution. The concentrations are shown in FIG. 1.

The components of the installation are installed in such a way that no product or water can enter the other distributing pipe system, different system pressures in the branch pipe systems do not have any effect on the required concentration (to this end, the mixing valves 13 to 19 are preceded by pressure reducers 50, 51), different consumptions/throughputs do not affect the mixture concentration, the mixture concentration is kept constant within narrow limits (±5% of the required concentration), the mixing valve can be manually or automatically adjusted to various mixture concentrations and the mixing valve can be adapted to the particular throughput.

Depending on practical requirements, a static mixer may be installed after the mixing valve.

After the mixing valves 13 to 19, the belt lubrication system is delivered to the spray systems 31 to 37 of the particular lubrication circuits through magnetic valve controls 24 to 30.

In this example of belt lubrication, different concentrations are required in the various lubrication circuits because different lubrication requirements have to be satisfied;

there are differences in the demand for disinfection in the various zones;

dilution by process liquids on belts require different concentrations;

specific functions of the installation require special lubricant concentrations.

Figure 2:
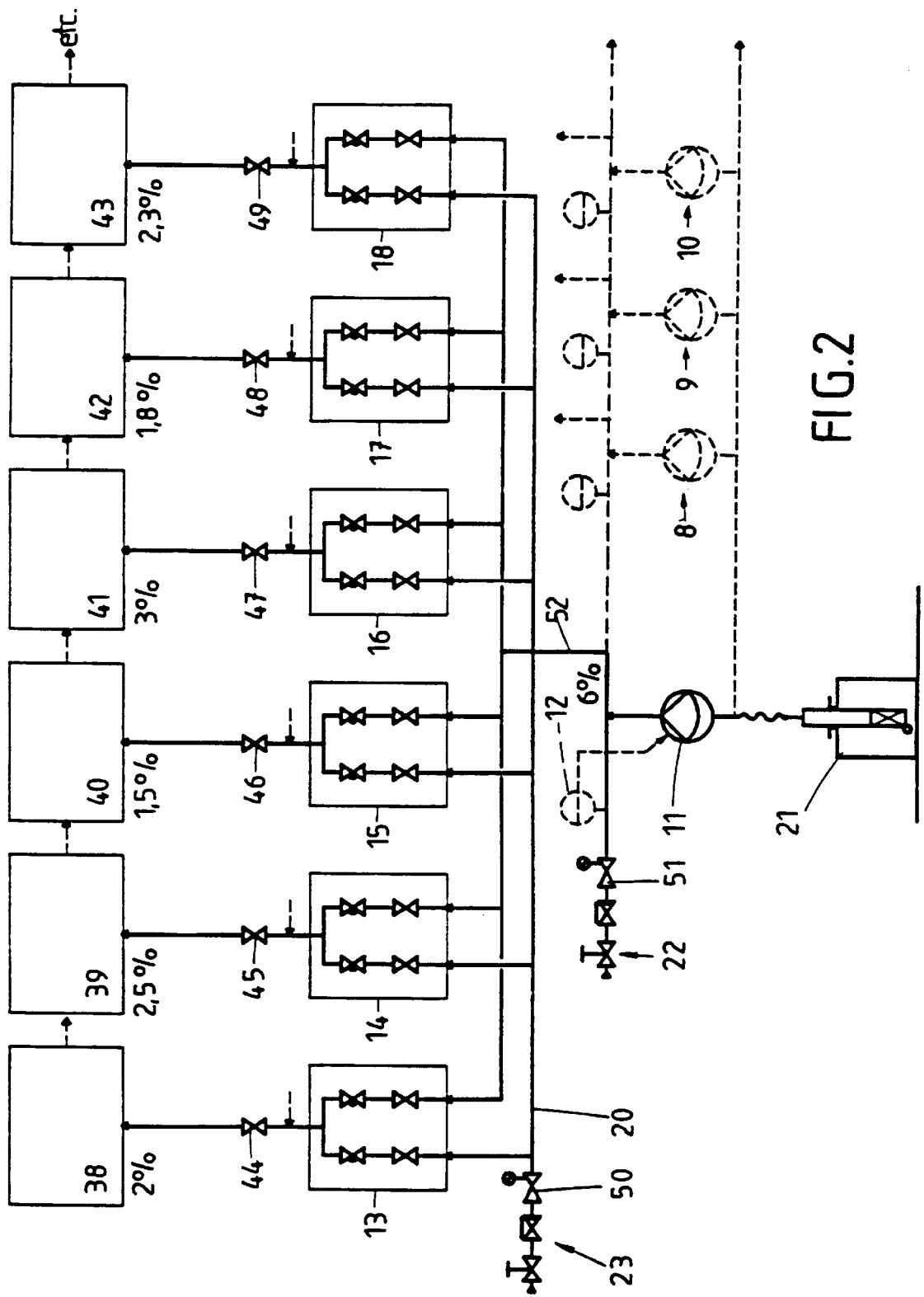
FIG. 2 is a process flow chart for a centralized cleaning system.

The invention is explained once again for another application with reference by way of example to preparation of the cleaner (FIG. 2). The reference numerals in FIG. 2 have the same meaning as in FIG. 1.

The above-mentioned cleaning systems in the food industry require different concentrations of cleaner according to the degree of soiling of the installations. If the cleaning solution were to be centrally supplied from a chemicals storeroom, this would mean that each concentration required would need a separate metering station which would prepare the solution concentration and which would be connected to the consumer (article to be cleaned) by a long distributing pipe system (chain-line illustration).

According to the present invention, a stock solution is prepared by proportional metering with a concentration around 3 to 6 times higher than the required concentration and is delivered to the articles to be cleaned. At each of the articles 38 to 40 to be cleaned, the stock solution is individually diluted to the required concentration (in-use concentration) and processed via the mixing valve 13 to 18. The principle involved is identical with the mixing of belt lubricating solutions. The articles to be cleaned are: filler (outside) 38, bottle washing machine 39, conveyors 40, external tank cleaning 41, walls and floors 42, shelves 43. The references 44 to 49 denote the removal valves before which air can be introduced into the pipe as required.

The invention affords the following advantages:

simple and inexpensive metering system for preparing the stock solution;

low capital investment for the distributing pipe for stock solution;

individual adjustment of the concentration of the cleaner at each article through utilization of the centralized supply of chemicals.

An alternative not covered by the invention would be the preparation of individual concentrations in situ at the articles or conveyors to be cleaned. However, this would have the disadvantage that the concentrate—as an aggressive and water-endangering liquid—would have to be transported through metering pipes in the plant which would increase the potential risk involved in handling these products.

In addition, this alternative would require greater capital investment in metering and measuring systems (water throughflow, empty signals), in cabling and assembly work and in maintenance and servicing in relation to the present invention with its hydraulic mixing valves.

LIST OF REFERENCED NUMERALS

1–7 Feed pipes
8–10 Metering stations according to the prior art
11 Metering pump
12 Pulse water meter
13–19 Mixing valves
20 Second branch pipe system
21 Concentrate tank
22 First fresh water connection
23 Second fresh water connection
24–30 Magnetic valves
31–37 Spray systems
38 Filler, outside
39 Bottle washing machine
40 Conveyors
41 External tank cleaning
42 Walls, floors
43 Shelves
44–49 Removal valves
50, 51 Pressure reducers
52 Distributing pipe for stock solution

The invention claimed is:

1. An installation for cleaning, lubricating, and/or disinfecting a conveyor belt comprising:

at least one metering station configured to couple to a diluting fluid source, to dilute a concentrated material and provide a treatment fluid containing a desired concentration of the material to a distribution pipe system;

a plurality of mixing valves, coupled in parallel to the distribution pipe system, such that each mixing valve receives some of the treatment fluid from the distribution pipe system and diluting fluid from a diluting fluid source and mixes said some of the treatment fluid with the diluting fluid to provide a further diluted fluid to a respective point of use, the desired concentration of the material in the treatment fluid being about 3 to about 6 times that of a concentration of the material in the further diluted fluid; and at least one of the following:

a first pressure reducing valve, which regulates a pressure at which the diluting fluid is delivered to said at least one metering station, to substantially prevent the concentration of the material in the treatment fluid from changing due to changes in pressure of the diluting fluid; or a second pressure reducing valve, which regulates a pressure at which the diluting fluid is provided to the plurality of mixing valves.

2. An installation as claimed in claim 1, further comprising at least one static mixer disposed between a respective one of said mixing valves and its respective point of use, to mix the further diluted fluid.

3. An installation as claimed in claim 1, wherein each mixing valve further comprises a manually or automatically operable control element for establishing the mixing ratio of the diluting fluid and the treatment fluid for each of said mixing valves.

4. An installation as claimed in claim 1, further comprising a magnetic valve prior to each point of use for regulating the total flow of the further diluted fluid to its respective point of use.

5. An installation as claimed in claim 1, further comprising a removal valve, prior to each point of use, which is configured to introduce an outside atmosphere into the further diluted fluid.

6. An installation as claimed in claim 1, comprising said first and second pressure reducing valves.

7. A process for cleaning, disinfecting and/or lubricating a conveyor belt, comprising the steps of:

diluting a concentrated material with a diluting fluid at a first mixing location to produce a treatment fluid containing a desired concentration of material;

distributing the treatment fluid to a plurality of second mixing locations coupled in parallel to a distribution pipe system;

mixing a diluting fluid with the treatment fluid at each of the second mixing locations to provide a further diluted fluid from said each of the mixing locations to respective points of use at the conveyor belt; and at least one of the following:
regulating the pressure at which the diluting fluid is provided to the first mixing location to substantially prevent changes in the diluting fluid pressure from changing the concentration of the material in the treatment fluid; or regulating the pressure at which the diluting fluid is provided to the second mixing locations;

wherein said step of diluting results in the concentration of the material in the treatment fluid being between about 3 and about 6 times that of a concentration of the material in the further diluted fluid required at the points of use.

8. A method as claimed in claim 7, further comprising the step of adjusting the mixing ratio of the diluting fluid and the treatment fluid.

9. A method as claimed in claim 7, further comprising the step of static mixing the further diluted fluid prior to applying the further diluted fluid to the conveyor belt at the points of use.

10. A method as claimed in claim 7, comprising both of the regulating steps.

11. An installation for cleaning, lubricating, and/or disinfecting a conveyor belt comprising:

at least one metering station configured to couple to a diluting fluid source, to dilute a concentrated material and provide a treatment fluid containing a desired concentration of the material to a distribution pipe system;

a plurality of mixing valves, coupled in parallel to the distribution pipe system, such that each mixing valve receives some of the treatment fluid from the distribution pipe system and diluting fluid from a diluting fluid source and mixes said some of the treatment fluid with the diluting fluid to provide a further diluted fluid to a respective point of use;

a removal valve, prior to each point of use, which is configured to introduce an outside atmosphere into the further diluted fluid; and at least one of the following:
a first pressure reducing valve, which regulates a pressure at which the diluting fluid is delivered to said at least one metering station, to substantially prevent the concentration of the material in the treatment fluid from changing due to changes in pressure of the diluting fluid; or a second pressure reducing valve, which regulates a pressure at which the diluting fluid is provided to the plurality of mixing valves.

* * * * *